United States Patent
Meijer (10) Patent No.: US 12,053,090 B2
(45) Date of Patent: Aug. 6, 2024

(54) PANELS COMPRISING A MECHANICAL LOCKING DEVICE AND AN ASSOCIATED ASSEMBLED ARTICLE

(71) Applicant: Välinge Innovation AB, Viken (SE)

(72) Inventor: Thomas Meijer, Viken (SE)

(73) Assignee: Välinge Innovation AB, Viken (SE)

( * ) Notice: Subject to any disclaimer, the term of this patent is extended or adjusted under 35 U.S.C. 154(b) by 231 days.

(21) Appl. No.: 17/847,655

(22) Filed: Jun. 23, 2022

(65) Prior Publication Data
US 2022/0408921 A1     Dec. 29, 2022

(30) Foreign Application Priority Data
Jun. 29, 2021 (SE) .................................. 2150833-8

(51) Int. Cl.
A47B 96/20 (2006.01)

(52) U.S. Cl.
CPC ........ *A47B 96/201* (2013.01); *A47B 2230/02* (2013.01)

(58) Field of Classification Search
CPC .......... A47B 96/201; A47B 2230/0096; A47B 2230/02; A47B 47/042; F16B 12/125; F16B 12/26
See application file for complete search history.

(56) References Cited

U.S. PATENT DOCUMENTS

| | | | | |
|---|---|---|---|---|
| 11,441,590 | B2 * | 9/2022 | Derelöv | F16B 5/0012 |
| 11,466,717 | B2 * | 10/2022 | Bruno | F16B 5/0012 |
| 11,702,844 | B2 * | 7/2023 | Svensson | E04F 13/0894 |
| | | | | 52/588.1 |
| 2012/0279161 | A1 * | 11/2012 | Hakansson | F16B 5/0614 |
| | | | | 52/588.1 |

(Continued)

FOREIGN PATENT DOCUMENTS

| | | |
|---|---|---|
| WO | 02055810 A1 | 1/2002 |
| WO | 2012154113 A1 | 5/2012 |
| WO | 2015105449 A1 | 12/2014 |

OTHER PUBLICATIONS

U.S. Appl. No. 18/422,368, Christian Boo, filed Jan. 25, 2024.
(Continued)

*Primary Examiner* — Mark R Wendell
(74) *Attorney, Agent, or Firm* — Boone IP Law (57) ABSTRACT

A set of panels including a first panel and a second panel configured to assume a locked state in which a first main plane of the first panel is arranged at an angle of between 30° and 150° relative to a second main plane of the second panel. A separate tongue arranged in an insertion groove of a groove is configured to cooperate with a tongue groove provided in an edge section of the second panel for locking the first and second panels to each other in a first direction perpendicular to the first main plane, and the edge section is configured to cooperate with the groove for locking the first and second panels to each other in a second direction parallel (Continued)

to the first main plane. A bottom portion of the groove includes an elevated portion arranged at least in an outer section of the groove along the second direction, wherein an area of the elevated portion is at least 3% of an area of a rectangular bounded region extending along boundaries of the bottom portion.

22 Claims, 7 Drawing Sheets

(56) References Cited

U.S. PATENT DOCUMENTS

| | | | |
|---|---|---|---|
| 2013/0014463 A1* | 1/2013 | Pervan | E04F 15/107 52/582.2 |
| 2016/0174704 A1* | 6/2016 | Boo | A47B 55/00 312/265.5 |
| 2017/0227035 A1 | 8/2017 | Fridlund | |

OTHER PUBLICATIONS

U.S. Appl. No. 18/422,425, Christian Boo, filed Jan. 25, 2024.
International Search Report (PCT/ISA/220) with English translation mailed on Jul. 22, 2022, by the European Patent Office as the Internal Searching Authority for International Application No. (PCT/SE2022/050628).
U.S. Appl. No. 17/398,416, Thomas Meijer, filed Aug. 10, 2021.
U.S. Appl. No. 17/514,055, Marko Sostar, filed Oct. 29, 2021.
U.S. Appl. No. 17/665,160, Oscar Rydsjö, filed Feb. 4, 2022.
U.S. Appl. No. 17/784,341, Johan Svensson, filed Jun. 10, 2022.
U.S. Appl. No. 17/870,215, Peter Derelöv, filed Jul. 21, 2022.
U.S. Appl. No. 17/959,010, Mindaugas Zacharenko, filed Oct. 3, 2022.
U.S. Appl. No. 18/058,037, Peter Derelöv, filed Nov. 22, 2022.
U.S. Appl. No. 18/191,404, Thomas Meijer, filed Mar. 28, 2023.
U.S. Appl. No. 18/239,924, Niclas HÅkansson, filed Aug. 30, 2023.
U.S. Appl. No. 18/440,330, Thomas Meijer, filed Feb. 13, 2024.
U.S. Appl. No. 18/441,480, Peter Derelöv, filed Feb. 14, 2024.

* cited by examiner

PANELS COMPRISING A MECHANICAL LOCKING DEVICE AND AN ASSOCIATED ASSEMBLED ARTICLE

CROSS REFERENCE TO RELATED APPLICATIONS

The present application claims the benefit of Swedish Application No. 2150833-8, filed on Jun. 29, 2021. The entire contents of Swedish Application No. 2150833-8 are hereby incorporated herein by reference in their entirety.

TECHNICAL FIELD

The disclosure generally relates to a set of panels comprising a first panel and a second panel that are configured to be locked to each other at angle of between 30° and 150°, such as essentially perpendicularly, to each other by means of a mechanical locking device.

The panels may be assembled and locked to each other to provide a box, such as a casket or a coffin, or to provide a furniture assembly, such as a kitchen fixture, a bookshelf, a cupboard, a wardrobe or a drawer.

BACKGROUND

WO 2015/105449 discloses a set of panels including a first and a second panel arranged perpendicularly to each other. The panels are provided with a mechanical locking device for locking a first edge of the first panel to a second edge of the second panel. An edge section of the second edge is insertable into the edge section groove at the first edge. A flexible tongue arranged in an insertion groove provided in the edge section groove cooperates with a tongue groove provided at the edge section of the second panel. A first thickness of a core material between the edge section groove and an outermost surface of the first edge is greater than a minimum second thickness of a core material of the edge section of the second panel.

The set of panels may provide an assembled product with a mechanical locking system having an improved strength and, optionally, stability.

Despite these and many other advantages of this type of sets there may be scenarios in which the robustness of the mechanical locking system may be insufficient or may be compromised. For example, the tongue groove may weaken the edge section to an unsatisfactory degree. Additionally, in some applications, a particularly strong locking function may be needed, preferably while maintaining at least some of the advantages mentioned above.

SUMMARY

It is therefore an object of at least embodiments of the present disclosure to provide a set of panels that is even more resistant against a high load and/or a high torque, such as in an edge section of the panels.

Another object of at least embodiments of the present disclosure is to provide a set of panels comprising a mechanical locking device that is particularly suitable for thinner panels, for example having a thickness not exceeding 19 mm, preferably not exceeding 16 mm.

Yet another object of at least embodiments of the present disclosure is to provide a balanced compromise between a design of cooperating elements of the mechanical locking device so that a satisfactory robustness and/or locking strength may be provided or maintained.

It is also an object to provide a corresponding assembled article.

These and other objects and advantages that will be apparent from the description have been achieved by the various aspects, embodiments and examples described below.

In accordance with a first aspect of the disclosure, there is provided a set of panels comprising a first panel and a second panel configured to assume a locked state in which a first main plane of the first panel is arranged at an angle of between 30° and 150°, such as between 45° and 135°, relative to a second main plane of the second panel. The set comprises a groove provided in the first panel, an edge section of the second panel, an insertion groove provided in the groove of the first panel, a separate tongue arranged in the insertion groove, and a tongue groove provided in the edge section of the second panel. The separate tongue is configured to cooperate, preferably engage, with the tongue groove for locking the first and second panels to each other in a first direction perpendicular to the first main plane and the edge section of the second panel is configured to cooperate, preferably engage, with the groove of the first panel for locking the first and second panels to each other in a second direction, which is parallel to the first main plane and which extend towards a side edge surface of the first panel. A bottom portion of the groove comprises an elevated portion arranged at least in an outer section of the groove along the second direction, wherein an area of the elevated portion is at least 3% of an area of a rectangular bounded region extending along boundaries of the bottom portion.

The elevated portion may reinforce a section, preferably an edge section, of the first panel, whereby the locking strength may be improved. Furthermore, by providing a groove in a section of the first panel, such as in the edge section thereof, the panel may become too weak for some applications, such as when the panels are configured to be assembled to provide a box, such as a casket or a coffin, or to provide a furniture assembly, such as a kitchen fixture, a bookshelf, a cupboard, a wardrobe or a drawer. In particular, the section comprising the groove may not be able to resist a torque exceeding a certain threshold value which, for example, may be induced when the panels are heavily loaded and/or when the edge section of the second panel is inserted into the groove. These problems may be accentuated when the groove is deep, such as when a distance along the first direction between a bottom of the groove and an outer face of the first panel adjacent to the bottom of the groove becomes too small. Accentuated problems may also originate from a cooperating surface of the groove in the outer section having an excessively large level arm around a pivot point situated at a bottom of the groove, wherein the cooperating surface may provide locking in the second direction. These potential deficiencies, however, may be counteracted, or in some applications even eliminated, by means of the elevated portion in accordance with the first aspect. Indeed, the elevated portion may reinforce the section and thereby provide a higher resistance against a high load and/or a high torque, especially along the second direction.

The edge section of the second panel may be shaped to accommodate the elevated portion, for example by comprising a recess. As a consequence of this shortening of the edge section along the first direction, e.g., whereby the lever arm during assembly and/or in a locked state may become shortened, the edge section may be strengthened.

In view of the above, a balanced compromise between the design of the edge sections may be provided such that a sufficiently high robustness and/or strong locking strength may be provided or maintained in both of the first and second panels.

The rectangular bounded region may extend along outer boundaries of the bottom portion along the first and/or second directions.

Throughout the disclosure when referring to "panels", the first and second panels are included as examples of such "panels".

Each panel may comprise a pair of faces and a pair of side edge surfaces extending between the faces. A face and a side edge surface of the, preferably first and/or second, panel may be arranged essentially perpendicularly to each other. Moreover, each panel may comprise a pair of side end surfaces (side portions) extending between the faces and the side edge surfaces. The side edge surfaces may be provided in a respective edge section of each panel.

Even though they may be defined with respect to the first panel, reference may typically also be made to the first and second (and third) directions when describing the second panel. For example, said directions may be used when referring to the second panel when the panels assume the locked state.

A thickness of each panel may be essentially constant, except possibly at one or both edge sections of the panel. Thereby, an inner face and an outer face may be provided at an essentially constant distance from each other in the first direction. For example, each panel may be substantially formed as parallelepipeds, such as rectangular parallelepipeds.

The first and second main planes may be arranged at angle of 30°-150° as seen from a (cross-sectional) side view, preferably along a third direction which is perpendicular to the first and second directions.

Generally herein, cooperating elements (such as between the separate tongue and the tongue groove, between the edge section and the groove, between a fitting groove and a corner portion, or between an overlapping portion and a face edge portion) may cooperate by direct engagement or indirectly. In any embodiment described herein, there may be a sealing agent, such as a wax, silicone, a rubber strip or an adhesive, provided between the cooperating elements, thereby providing examples of an indirect engagement.

In some embodiments, the area of the elevated portion may be at least 10%, such as at least 20%, or even at least 30%, of the area of the rectangular bounded region.

In some embodiments, the area of the elevated portion may not exceed 70% of the area of the rectangular bounded region, for example being between 3% and 70%, such as 10-70% or 10-50%, such as 20-60% or 20-35%.

The panels disclosed herein may comprise or may be wood-fibre based boards, such as particle boards, HDF boards, MDF boards, OSB boards, solid wood boards, wood-fibre composite boards or plywood boards. For example, a core of the panel may be any of these boards. Optionally, the boards may be provided with a decorative structure on at least one of its faces, such as paint or a decorative layer at least partially encapsulating the board. For example, the side end surfaces and/or the side edge surfaces of the boards may be provided with border strips for providing a reinforcement and/or a decorative effect of the boards. The set of panels in accordance with the first aspect may be particularly advantageous for anisotropic boards, soft boards or brittle boards, which may be more prone to becoming deformed or even damaged under a high load and/or a high torque, such as by cracking or delamination.

The panels disclosed herein may alternatively comprise or be polymer-based boards, for example comprising thermoplastic polymers, such as PVC, or comprising a thermosetting resin, such as a melamine formaldehyde resin.

The area of the elevated portion and the area of the bounded region may be defined in a cross-sectional side view of the first panel, preferably along a third direction which is perpendicular to the first and second directions.

The bounded region may be defined by a first and a second plane that are parallel to the first main plane, wherein the first plane extends along an innermost portion of the groove and the second plane extends along a highest portion of the elevated portion along the first direction. Alternatively, or additionally, the bounded region may be defined by a third and a fourth plane that extend along the first direction and along a third direction which is perpendicular to the first and the second directions, wherein the third and the fourth planes extend along a respective outermost wall portion of the bottom portion along the second direction.

The groove may be provided in an edge section of the first panel. Alternatively, or preferably additionally, the groove may be provided in an inner face of the first panel.

A, preferably maximal, width of the elevated portion along the second direction may be at least 20%, preferably at least 30% or even at least 40%, of a, preferably maximal, width of the bottom portion along the second direction.

A, preferably maximal, height of the elevated portion along the first direction may be 5-60%, preferably 12-50%, of a, preferably maximal, depth of the groove. Thereby, a stable assembly of the panels may be provided while maintaining a robust edge section of the first panel and/or a strong locking function.

The groove may further comprise a main groove portion provided outside of the bottom portion along the first direction. The edge section of the second panel may comprise a first and a second edge portion, wherein the second edge portion is configured to cooperate with the main groove portion in the locked state of the first and second panels. The second edge portion and the main groove portion may be configured to cooperate for locking in the second direction.

A first edge portion of the edge section of the second panel may taper outwards, i.e., moving outwardly, along the first direction. Thereby, the second panel may be guided into the groove in an improved manner.

An external wall of the elevated portion may extend between an innermost portion of the groove and a main groove portion provided outside of the bottom portion along the first direction.

An external wall of the elevated portion may comprise at least one planar segment.

An external wall of the elevated portion may comprise a convex segment and/or a concave segment. By means of a convex segment more core material may be provided in the groove and by means of a concave segment a transition between the elevated portion on the one hand and the innermost portion of the groove and the main groove portion on the other hand may be smoothened. In both these scenarios the risk of cracking of an edge section of the first panel may be reduced.

A shape of an external wall of the elevated portion may substantially correspond to a shape of a first tapering segment of the first edge portion configured to face the external wall in the locked state. Thereby, a larger portion of the groove may be occupied with material from the edge section of the second panel, whereby the locking strength may be even further improved.

At least an inner section of a main groove portion of the groove may have an essentially constant width, preferably along the second direction, and/or at least a section of a second edge portion of the edge section of the second panel may have an essentially constant width, preferably along the second direction. Thereby, a simple assembly of the panels may be provided while providing locking of the panels in the second direction.

The bottom portion may be asymmetric along a centre line extending along the first direction. For example, a major portion, such as at least 50% of the area, of the elevated portion may be provided in the outer section of the groove. In some embodiments, at least 70% of the area or sometimes even the entire area may be provided in the outer section.

The bottom portion and/or the first edge portion may be disposed inwardly of an opening of the insertion groove along the first direction in the locked state. Preferably, the bottom portion is provided inwardly of a section of the groove having an essentially constant width along the second direction. Said section may be at least an inner section of the main groove portion.

The elevated portion, preferably the entire bottom portion, may be spaced from the edge section of the second panel in the locked state by at least one space. Thereby, an improved, such as a more failsafe, locking of the panels may be provided. For example, the panels may be locked in the first direction by the cooperation between the separate tongue and the tongue groove on the one hand and by a cooperation between a fitting groove provided in the edge section and a corner portion of the first panel on the other hand.

A thickness, such as a minimal thickness, along the second direction between the groove and a side edge surface of the first panel may be greater than a minimal thickness of the edge section of the second panel.

A ratio between a width of the elevated portion along the second direction and a depth of the groove may exceed 0.20. Thereby a well-balanced compromise between a high load resistance and/or tensile strength along the first and second directions and the locking strength may be provided.

An opening of the groove may be wider than an inner section of a main groove portion of the groove.

The first main plane may be arranged essentially perpendicularly to the second main plane. The second direction may thereby be perpendicular to the second main plane of the second panel.

An edge strip, such as an edge banding, may be provided on the side edge surface. Thereby, the reinforcement and/or strength of the edge section of the first panel may become further improved. Alternatively, or additionally, by means of the elevated portion, a thickness of the edge strip may become smaller. Thereby, less material may be used, and the cost may be reduced. Also, the edge strip may conceal a groove extending to the side edge surface. An edge strip may be particularly useful when the first, and preferably the second, panel comprises wood-fibre based boards, such as particle boards.

In accordance with a second aspect of the disclosure, there is provided an assembled article comprising the set of panels in accordance with any of embodiments of the first aspect. The assembled article may be a box, such as a casket or a coffin, or to provide a furniture assembly, such as a kitchen fixture, a bookshelf, a cupboard, a wardrobe or a drawer.

Aspects of the disclosure has mainly been described above with reference to a few embodiments. However, as is readily appreciated by a person skilled in the art, other embodiments than the ones disclosed above are equally possible within the scope of aspects of the disclosure, as defined by the appended patent claims.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. Reference to one or a plurality of "at least one element", etc., may shortly be referred to as "the element(s)".

BRIEF DESCRIPTION OF THE DRAWINGS

The disclosure will in the following be described in connection to exemplary embodiments and in greater detail with reference to the appended exemplary drawings, wherein.

DETAILED DESCRIPTION

Next, various embodiments of a set of panels comprising a first 1 and a second 2 panel will be described with reference to the embodiments in, e.g., FIGS. 1a-1d, 2a-2g, 3a-3f, 4a-4d, 5a-5e, 6a-6b and 7a-7e. The panels are configured to assume a locked state in which a first main plane M1 of the first panel 1 is arranged at an angle $\phi$ of between 30° and 150°, such as between 45° and 135°, relative to a second main plane M2 of the second panel 2. In some embodiments, and as shown in FIGS. 1a-1c, 2a-2d, 3a-3f, 4a-4d, 5a-5e and 7a-7e, the first main plane M1 is arranged essentially perpendicularly, i.e. 90°, to the second main plane M2. In some embodiments, and as shown in FIGS. 6a and 6b, the first main plane M1 is arranged at an angle φ of 45° and 135° relative to the second main plane M2, respectively. In embodiments, a normal N1 of the first main plane M1 may be arranged at an angle φ of between 30° and 150°, such as between 45° and 135°, relative to a normal N2 second main plane M2, for example at an angle φ=90°.

Generally herein, the panels 1, 2 may be configured to be assembled to an assembled article 20, which may be a box, such as a casket or a coffin, or a furniture assembly, such as a kitchen fixture, a bookshelf, a cupboard, a wardrobe or a drawer. See FIGS. 7c-7d for embodiments of such an article 20.

Figures 1A, 1B:
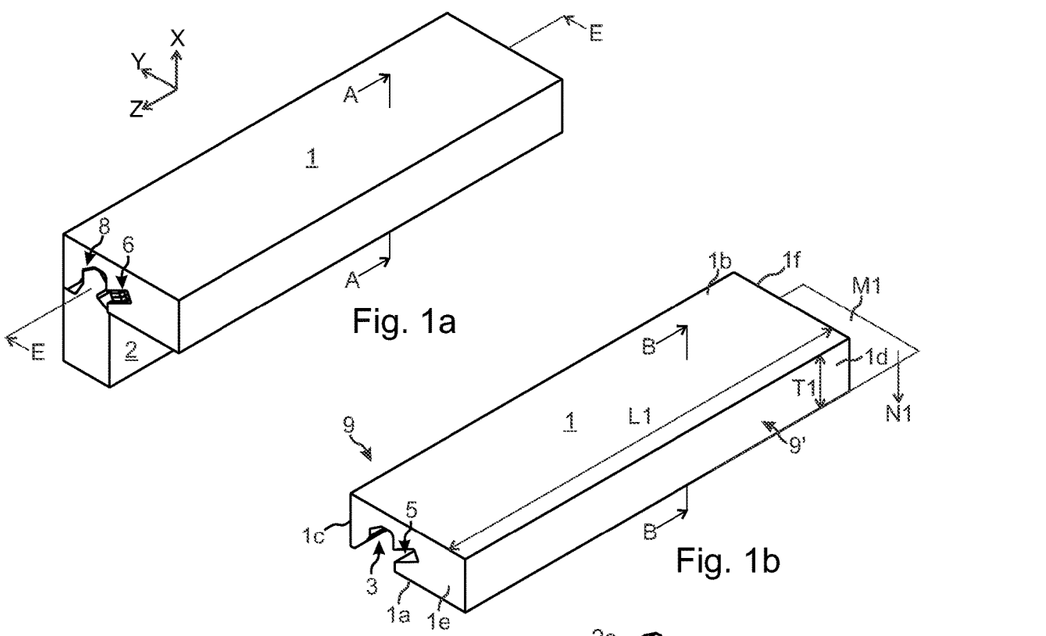
FIGS. 1a-1c illustrate in perspective views an embodiment of a set of panels in a locked state (FIG. 1a) and in an unlocked state (FIGS. 1b-1c).
Figure 1C:
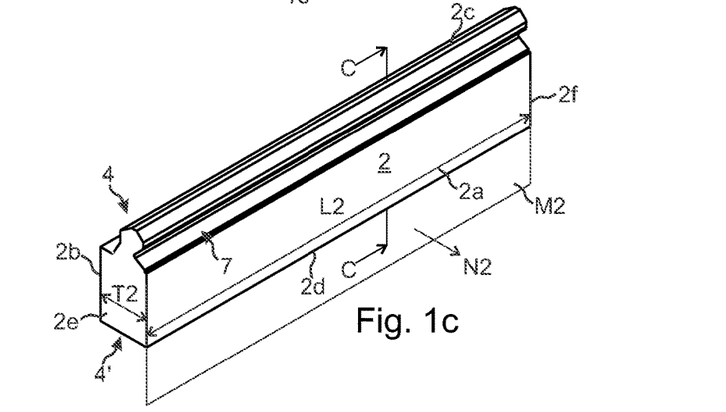
Figure 1D:
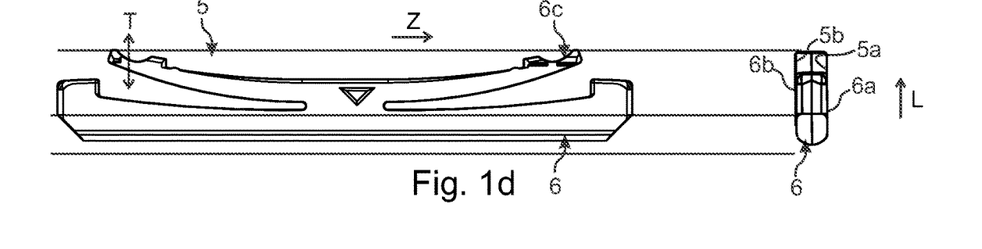
FIG. 1d illustrates an embodiment of a separate tongue in a cross-sectional top view and in a cross-sectional side view that may be used for locking the panels in FIGS. 1a-1c.

As shown in, e.g., FIGS. 1a-1c, each panel 1, 2 may comprise a pair of inner 1a, 2a and outer 1b, 2b faces, a pair of side edge surfaces 1c, 1d, 2c, 2d extending between the faces 1a, 1b, 2a, 2b, and a pair of side end surfaces 1e, 1f, 2e, 2f extending between the faces and the side edge surfaces 1c, 1d, 2c, 2d. The inner faces 1a, 2a may be provided adjacent each other in the locked state. The side edge surfaces 1c, 1d, 2c, 2d may be provided in a respective edge section 9, 9', 4, 4' of each panel 1, 2. In the locked state, a side edge surface 2c of an edge section 4 of the second panel 2 may face and/or may be provided in an inner face 1a of the first panel 1. Preferably, an edge section 9 of the first panel 1 and the edge section 4 may be configured to be adjacent to each other in the locked state. The outer face 2b of the second panel and the side edge surface 1c of the first panel may be configured to be essentially flush with each other in the locked state. The side edge surface 1c may be arranged essentially perpendicularly to the inner 1a and/or the outer 1b face(s).

Each panel 1, 2 may comprise a core of, or may be, a wood-fibre based board, such as a particle board, HDF board, MDF board, OSB board, solid wood board, wood-fibre composite board or plywood board. Generally herein, and as shown schematically in FIG. 3c, a fibre-orientation of wood fibres 14, 15 of the wood-fibre based board of the first panel 1 (second panel 2) may be essentially parallel with the first main plane M1 (second main plane M2). Optionally, the side edge surfaces 1c, 1d, 2c, 2d and/or the side end surfaces 1e, 1f, 2e, 2f of the panels may be provided with border strips.

Preferably, the panels 1, 2 have an essentially uniform thickness T1, T2, cf. FIGS. 1b-1c. In non-limiting examples T1, T2 is larger than 10 mm, such as 12-18 mm or 19-25 mm. Thinner panels, for example, may have a thickness not exceeding 19 mm, preferably not exceeding 16 mm, such as 8-19 mm or 10-16 mm.

The set comprises a mechanical locking device for locking the first 1 and second 2 to each other. The set comprises a groove 3 provided in the first panel 1, preferably in the inner face 1a thereof and preferably in the edge section 9. The set further comprises an insertion groove 5 provided in the groove 3 in which a separate, preferably flexible, tongue 6 is arranged. Moreover, the set comprises the edge section 4 of the second panel and a tongue groove 7 provided in the edge section 4.

The first main plane M1 may be parallel to the inner 1a and/or outer 1b face(s) and the second main plane M2 may be parallel to the inner 2a and/or outer 2b face(s). Preferably, the first M1 and second M2 planes extend along the inner face 1a and the inner face 2a, respectively.

The first panel 1 may extend in a first direction X perpendicular to the first main plane M1 and in a second direction Y that is parallel to the first main plane M1 and extends towards a side edge surface 1c, which may be provided in the edge portion 9 of the first panel 1. In the locked state the second direction Y may be parallel to a projection N2' of the normal N2 along the first main plane M1, cf. FIGS. 6a-6b. It is noted that N2 and N2' may coincide when φ=90°. The first panel 1 may also extend in a third direction Z, which is perpendicular to the first X and second Y directions. Hence, the first X, second Y and third Z directions may be parallel to a vector extending between the faces 1a, 1b, between the side edge surfaces 1c, 1d, and between the side end surfaces 1e, 1f, respectively.

The separate tongue 6 is configured to cooperate with the tongue groove 7 for locking the first 1 and second 2 panels to each other in the first direction X. Moreover, the edge section 4 is configured to cooperate with the groove 3 for locking the first 1 and second 2 panels to each other in the second direction Y.

The panels 1, 2 may be configured to be locked to each other by a relative essentially linear displacement of the panels, preferably along the first direction X, when the first main plane M1 is arranged at the angle φ of 30°-150°, e.g., essentially at 90°, relative to the second main plane M2.

The groove 3 may comprise a bottom portion 3a and a main groove portion 3b provided outside of the bottom portion 3a along the first direction X. The bottom portion 3a may be disposed inwardly of an opening 5a of the insertion groove 5 along the first direction X. At least a section of the main groove portion 3b may be wider than the bottom portion 3a along the second direction Y. The main groove portion 3b includes an opening section 3c and an inner section 10a. The opening 3c of the groove 3 preferably is wider than the inner section 10a of the main groove portion 3b. As shown in, e.g., FIGS. 1a-1b, 2c, 3c, 3e-3f, 4c, 5c, 5e and 6a-6b, the bottom portion 3a may be asymmetric along a centre line CX of the bottom groove 3a extending along the first direction X, preferably as seen in a cross-sectional side view.

The edge section 4 may comprise a first 4a and a second 4b edge portion, wherein the second edge portion 4b is configured to cooperate with the main groove portion 3b in the locked state, preferably with the inner section 10a. With respect to the second panel 2 the first edge portion 4a may be arranged outside of the second edge portion 4b along the first direction X. In the locked state, and with respect to the first panel 1, the first edge portion 4a may be disposed inwardly of the opening 5a along the first direction X. Moreover, with respect to the second panel 2, the first edge portion 4a preferably tapers moving outwardly along the first direction X. Thereby, the first edge portion 4a may comprise a recess 4e for accommodating an elevated portion 8 (introduced below) of the groove 3. Preferably, in the locked state also the first edge portion 4a is asymmetric along the centre line CX. The edge section 4 may comprise a depression 4f, preferably in the outer face 2b, configured to accommodate a lip portion 9a of the edge section 9 in the locked state. The lip portion 9a may be provided outside of the groove 3 along the second direction Y. The lip portion 9a may extend beyond the insertion groove 5 along the first direction X in a direction towards the inner face 1a, preferably extending to the inner face 1a and/or the first main plane M1. Thereby, the side edge surface 1c may extend beyond the insertion groove 5, preferably to the inner face 1a.

Preferably, at least the inner section 10a of the main groove portion 3b has an essentially constant width WG along the second direction Y. Alternatively, or preferably additionally, at least a section 10b of the second edge portion 4b has an essentially constant width WE, preferably along the second direction Y as specified in the locked state. The constant width(s) WG and/or WE of the inner section 10a and/or the section 10b may extend along the first direction X, such as corresponding to at least 5% or at least 10% of a depth D (described further below) of the groove 3; for example, 5-40% of the depth, such as 10-30% of the depth. In the locked state the inner section 10a and the section 10b may be provided inwardly of the insertion groove 5 along the first direction X.

A, preferably minimal, thickness U1 along the second direction Y between the groove 3 and the side edge surface 1c of the first panel 1 may be greater than a minimal thickness U2 of the edge section 4 of the second panel 2. For instance, the thickness U1 may be a distance between the inner section 10a of the main groove portion 3b and the side edge surface 1c. The minimal thickness U2 may be determined along a direction DA provided at an angle α with respect to the second main plane M2, preferably with respect to the main plane M2, see FIG. 2d. U2 may be measured, e.g., from a bottom of the tongue groove 7 to an inner surface 4h of the depression 4f, such as to or inside of the section 10b. For example, the measurement may be performed with a caliper. Preferably, the angle α is 45°-135°. In non-limiting examples, U1 may be at least 1.1 or at least 1.25, such as between 2.0 and 3.0, times U2. Alternatively, or additionally, a ratio U1/T1 may generally herein exceed 0.35, preferably being 0.35-0.60, such as 0.44-0.55.

The separate tongue 6 may comprise a polymeric material and, preferably, a reinforcement structure, such as glass fibres. Moreover, as shown schematically in FIG. 1d, and which is conceivable in any of the embodiments in FIGS. 1a-1c, 2a-2g, 3a-3f, 4a-4d, 5a-5e, 6a-6b and 7a-7e, the separate tongue 6 may comprise flexible protrusions 6c that are bendable in a transverse direction T of the separate tongue and that may displace the separate tongue in the insertion groove 5 during locking, which for example may be a snap action. The displacement may be caused by virtue of a biasing force of the flexible protrusions 6c. The separate tongue 6 in FIG. 1d may be referred to as a bristle tongue, which preferably is formed by injection moulding. The separate tongue 6 may be embodied as in described, e.g., on page 8, line 14 to page 9, line 3, and FIGS. 4a-4d in WO 2012/154113 A1, whose content hereby is incorporated by reference.

The insertion groove 5 may be provided in an inner wall 12d of the groove 3 along the second direction Y. Preferably, the insertion groove 5 is inclined with respect to the main plane M1, such as by an angle β of 10°-60°. The insertion groove 5 may comprise a pair of oppositely arranged internal walls 5a, 5b, see, e.g., FIG. 1d. Preferably, the separate tongue 6 is displaceably inserted in the insertion groove 5, such as by being linearly displaceable along a direction L. During locking, the separate tongue 6 may be displaced into the insertion groove 5 and thereafter out of the insertion groove into the tongue groove 7. During locking, the separate tongue 6 may be displaced into the insertion groove by cooperation, such as engagement, between the separate tongue and the edge section 4, such as a second tapering segment 4d of the first edge portion 4a configured to face the innermost portion 12a and/or the inner wall 12d in the locked state. The separate tongue may comprise two opposite displacement surfaces 6a, 6b, one or both of which may be displaceable against the, preferably, parallel, internal wall(s) 5a, 5b during locking.

The tongue groove 7 may be provided in the inner face 2a of the second panel 2. With respect to the second panel 2, the tongue groove 7 preferably is provided inwardly of the section 10b along the first direction X, wherein the section 10b has an essentially constant width WE (see region between the broken lines in FIG. 2b). In some embodiments, the bottom of the tongue groove 7 is provided inwardly of the section 10b. The tongue groove may comprise a tongue wall 7a configured to engage with the separate tongue 6 in the locked state. For example, the separate tongue 6 may engage with the tongue groove 7 outwardly of the section 10a and/or inwardly of the section 10b. Preferably, the tongue wall 7a is inclined with respect to the second main plane M2, such as by an angle δ of 25°-65°. The tongue groove may comprise an opposite tongue wall 7b, e.g., being inclined at an angle E of 25°-65 w.r.t. the main plane M2. For example, tongue groove may be substantially triangularly shaped.

The second panel 2 may comprise a fitting groove 10, preferably provided in the edge section 4 and in the inner face 2a. The fitting groove 10 may be provided inwardly of the tongue groove 7 along the first direction X. The fitting groove 10 may be configured to cooperate with a corner portion 11 of the first panel 1, preferably provided in the inner wall 12d and/or the inner face 1a, such as forming a joining portion between them.

Figure 2A:
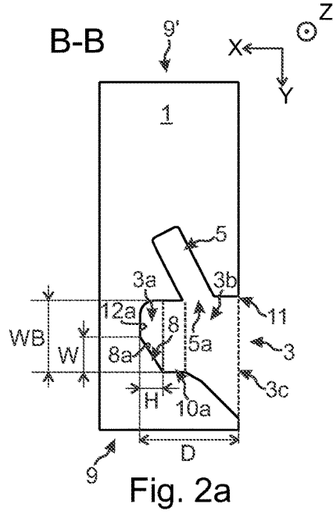
FIGS. 2a-2d illustrate cross-sectional side views of the set of panels in FIGS. 1a-1c along the lines A-A, B-B and C-C and an enlarged partial cross-sectional side view of the set of panels in FIG. 2c.
Figure 2B:
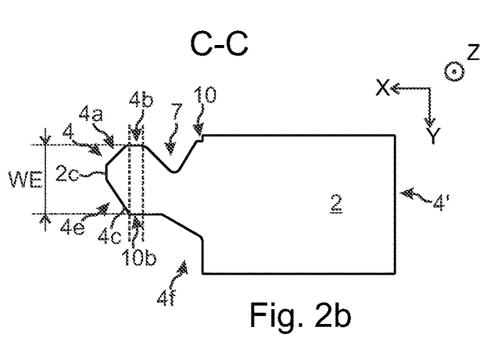
Figure 2C:
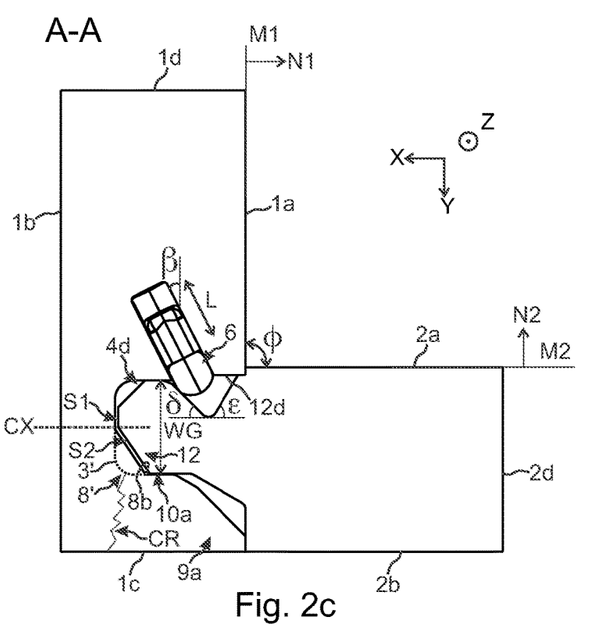
Figure 2D:
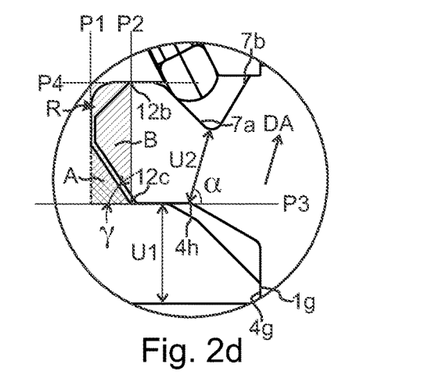

In the locked state the first 1 and second 2 panels preferably abut each other such that at least a face edge portion 1g of the inner face 1a provided outside of the groove 3 along the second direction Y may be concealed, cf. FIG. 2d. For example, an overlapping portion 4g of the depression 4f may cooperate, such as engage, with the face edge portion 1g.

The cooperation between the separate tongue 6 and the tongue groove 7 and, preferably, between the fitting groove 10 and the corner portion 11 and/or between the overlapping portion 4g and the face edge portion 1g, may provide locking of the panels 1, 2 in the first direction X. Moreover, cooperation between the inner section 10a and the section 10b, and optionally between the fitting groove 10 and the corner portion 11, may provide locking of the panels 1, 2 in the second direction Y.

The bottom portion 3a comprises an elevated portion 8 arranged at least in an outer section 12 of the groove 3 along the second direction Y. For example, the outer section 12 may be provided outside of the centre line CX along the second direction Y. The bottom portion 3a may completely house the elevated portion 8. An area A of the elevated portion 8 is at least 3%, such as at least 10% or at least 20%, of an area B of a rectangular bounded region R extending along boundaries of the bottom portion 3a. For example, the area A may be 3-70%, such as 10-70% or 10-50%, such as 20-60% or 20-35% of the area B. Preferably, the areas A, B are defined in a cross-sectional side view of the first panel 1, such as in a view along the third direction Z, cf. FIGS. 2d, 3d, 4d and 5d.

The bounded region R may be defined by a first plane P1 and a second plane P2 that each is parallel to the first main plane M1, wherein the first plane P1 extends along an innermost portion 12a of the groove 3 and the second plane P2 extends along a highest portion 8b of the elevated portion 8 along the first direction X. Alternatively, or preferably additionally, the bounded region R may be defined by a third P3 and a fourth P4 plane that each extends along the first direction X and along the third direction Z, wherein the third P3 and the fourth P4 planes extend along a respective outermost wall portion 12b, 12c of the bottom portion 3a along the second direction Y.

The elevated portion 8 may at least be defined by the first plane P1 and the third plane P3. In particular, the elevated portion 8 may be disposed within the rectangular bounded region R.

For perpendicularly arranged panels, such as shown in FIGS. 1a-1c, 2a-2d, 3a-3d, 4a-4d, 5a-5e and 7a-7b, the bounded region R may be defined by a third plane P3 and a fourth plane P4 that each is parallel to the second main plane M2, wherein the third P3 and the fourth P4 planes extend along a respective outermost wall portion 12b, 12c of the bottom portion 3a provided along the second direction Y. Similar statements may be made for panels arranged at an angle φ of 30°-150°, such as shown in FIGS. 6a-6b, provided that the second main plane M2 is rotated in a clockwise direction around an axis being parallel with the third direction Z by an angle of 90°−φ such that a rotated second main plane M2' may be obtained and used instead of M2. After the rotation the main planes M1, M2' may be arranged perpendicularly to each other. It is remarked that an obtuse angle φ implies a rotation by a negative angle, i.e., a rotation by a positive angle φ−90° in a counterclockwise direction.

The elevated portion 8 may be elevated along the first direction X with respect to the innermost portion 12a. For example, it may be elevated with respect to the plane P1. An external wall 8a of the elevated portion may extend between the innermost portion 12a and the main groove portion 3b. As shown in, e.g., FIGS. 2a, 3a, 3e-3f, 5a and 5e, the innermost portion 12a may be an innermost wall of the groove 3, for example being planar and, preferably extending along the second direction Y. Alternatively, the innermost portion 12a may be a deepest section of the, preferably inclined, external wall 8a as shown in, e.g., FIG. 4a.

The elevated portion 8 may have an extension in the first X and second Y directions and may extend along a part of a width WB of the bottom portion 3a along the second direction Y, cf. FIGS. 2a, 3a, 4a, 5a and 5e. For example, the elevated portion 8 may be arranged the outer section 12 only. A width W of the elevated portion 8 along the second direction Y may be at least 20%, preferably at least 30%, of the width WB of the bottom portion 3a. For example, W may be 20-80% or 20-60%, such as 30-50%, of WB. Moreover, a height H of the elevated portion 8 along the first direction X may be 5-60%, preferably 12-50%, of a depth D of the groove 3. The width W and/or height H may be a maximal width and/or maximal height. The depth D may be a distance, such as a maximal distance, along the first direction X from the innermost portion 12a to the inner face 1a of the first panel. A ratio W/D between the width W and the depth D may exceed 0.20, such as 0.20-0.60, such as 0.25-0.50. In non-limiting examples, 1 mm≤W≤WB, such as 2 mm≤W≤5 mm, and/or 1 mm≤H≤4 mm.

The area B may be calculated as WB*H. For a substantially triangularly shaped elevated portion 8, the area A may be calculated as W*H/2.

In some embodiments, and as shown in, e.g., FIGS. 4a-4d, the elevated portion 8 may extend along substantially the entirety of the width WB of the bottom portion 3a.

The external wall 8a may comprise at least one planar segment. In FIGS. 2a-2d and 4a-4d the external wall 8a comprises a single, preferably inclined, planar segment and in FIGS. 3a-3d a plurality of, such as two or three, planar elements. For example, the elevated portion 8 may be substantially triangularly shaped, preferably as seen in a cross-sectional side view. An angle γ between an inclined planar external wall 8a and the second main plane M2 may be 0°-80°, such as 25°-70°.

Figure 3A:
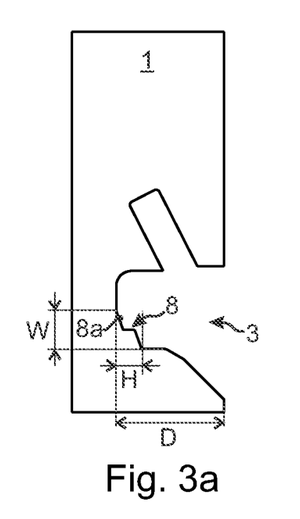
FIGS. 3a-3d illustrate cross-sectional side views of an embodiment of a set of panels in an unlocked state and a locked state and an enlarged partial cross-sectional side view of the set of panels in FIG. 3c.
Figure 3B:
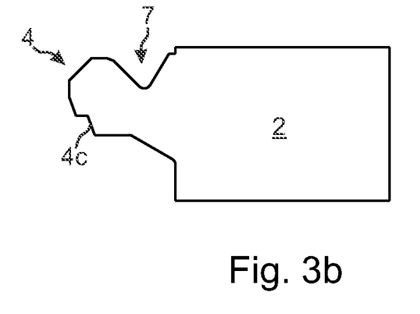
Figure 3C:
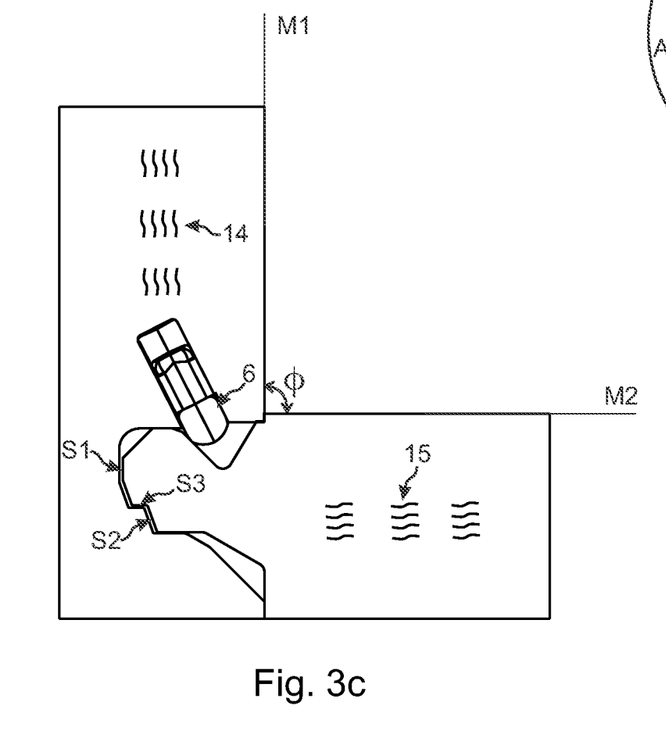
Figure 3D:
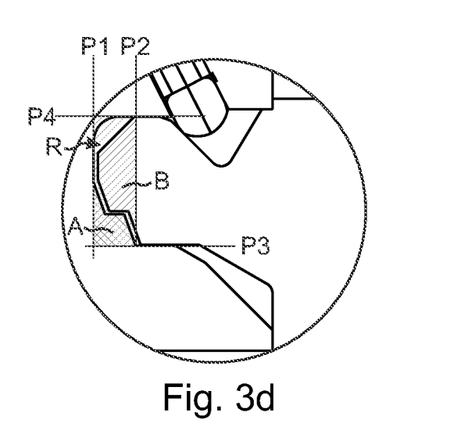
Figure 3E:
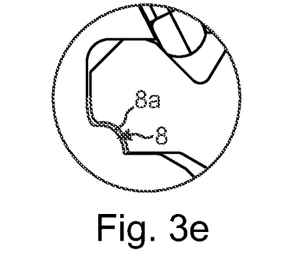
FIGS. 3e-3f illustrate in enlarged partial cross-sectional side views embodiments of a set of panels in a locked state.
Figure 3F:
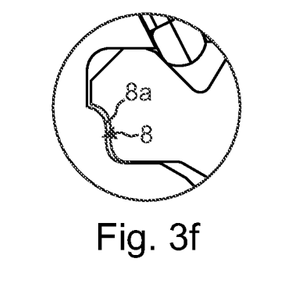
Figure 4A:
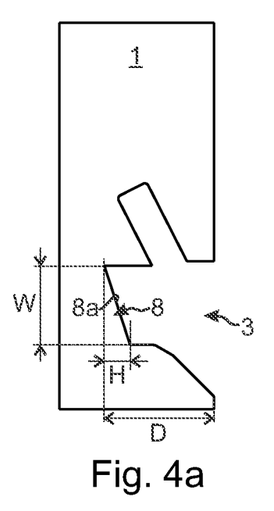
FIGS. 4a-4d illustrate cross-sectional side views of an embodiment of a set of panels in an unlocked state and a locked state and an enlarged partial cross-sectional side view of the set of panels in FIG. 4c.
Figure 4B:
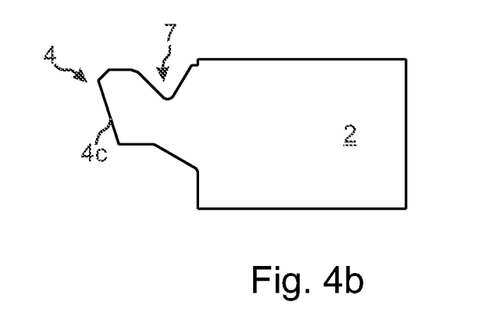
Figure 4C:
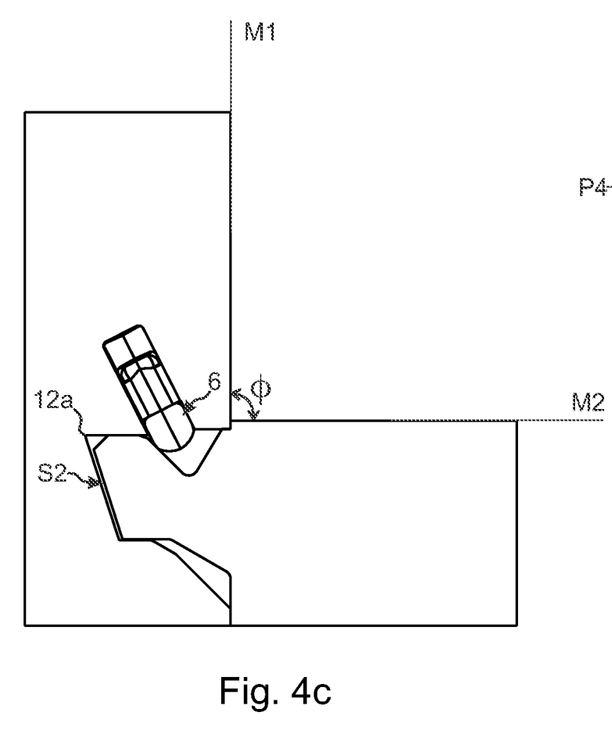
Figure 4D:
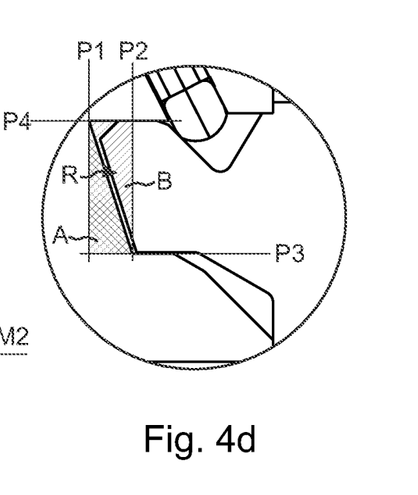
Figure 5A:
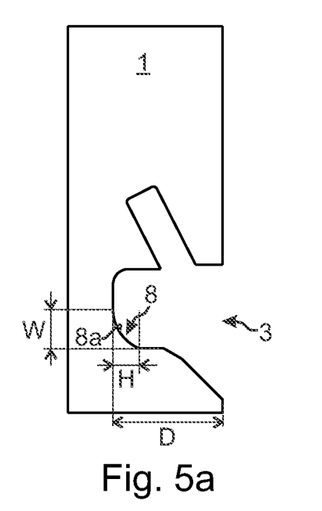
FIGS. 5a-5d illustrate cross-sectional side views of an embodiment of a set of panels in an unlocked state and a locked state and an enlarged partial cross-sectional side view of the set of panels in FIG. 5c.
Figure 5B:
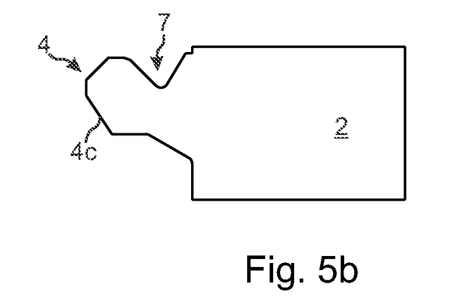
Figure 5C:
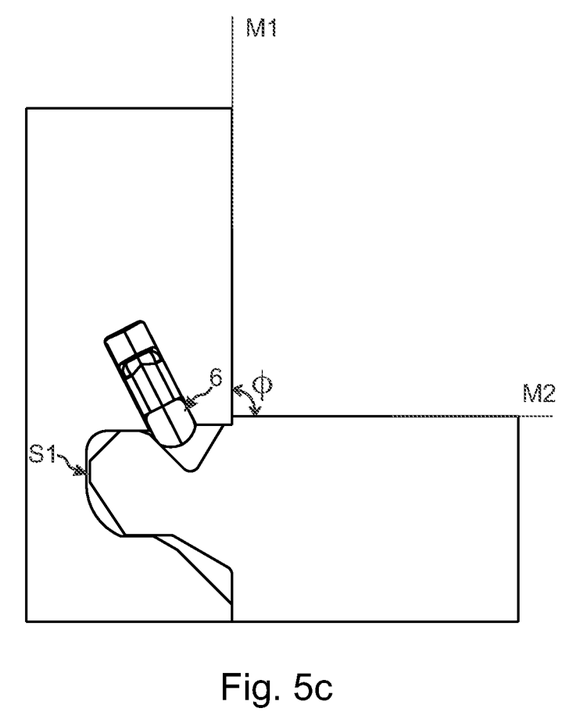
Figure 5D:
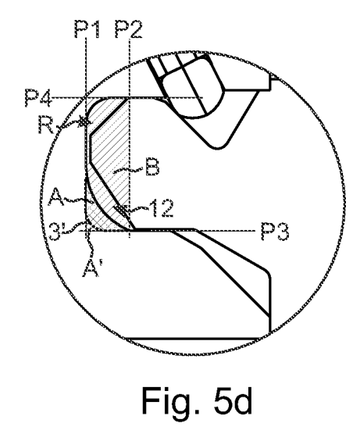
Figure 5E:
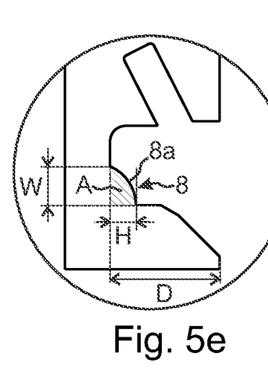
FIG. 5e illustrates in a cross-sectional side view an embodiment of a first panel in an unlocked state.
Figures 6A, 6B:
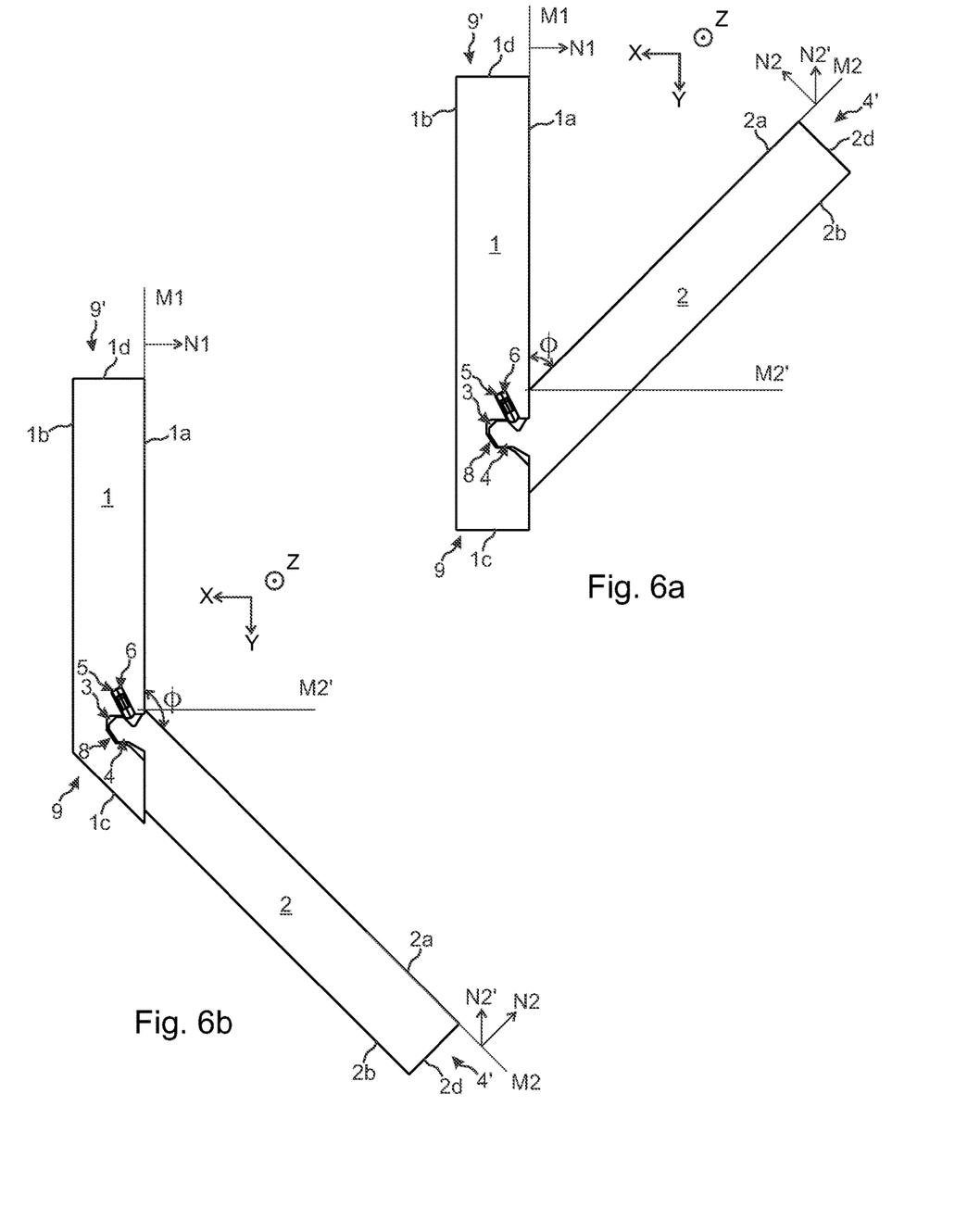
FIGS. 6a-6b illustrate cross-sectional side views of embodiments of a set of panels in a locked state.

In FIGS. 3e-3f and 5e the external wall 8a comprises a convex segment and in FIGS. 3f and 5a-5d the external wall 8a comprises a concave segment. The area A of an elevated portion comprising a convex segment, such as that in FIG. 5e, may be up to 70% of the area B.

As shown in, e.g., FIGS. 2a-2d, 3a-3f, 4a-4d, 6a-6b and 7a-7c, a shape of the external wall 8a may substantially correspond to a shape of a first tapering segment 4c of the first edge portion 4a configured to face the external wall in the locked state.

In the locked state, the elevated portion 8, preferably the entire bottom portion 3a, may be spaced from the edge section 4 by at least one space S1, S2, S3, see, e.g., FIGS. 2c, 3c, 4c and 5c. In any of these embodiments, the inner section 10a and the section 10b preferably cooperate.

Figure 7A:
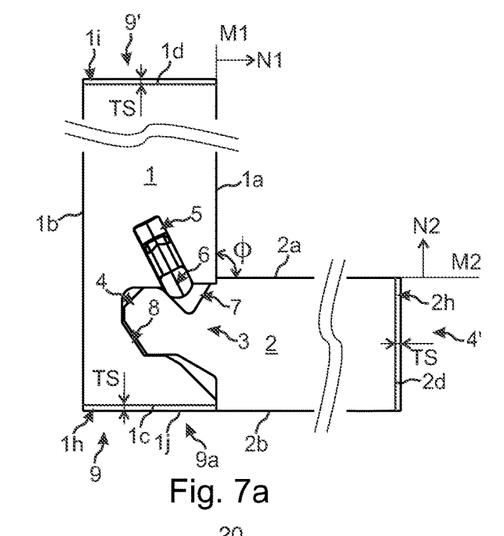
FIGS. 7a-7b illustrate cross-sectional side views of embodiments of a set of panels.
Figure 7B:
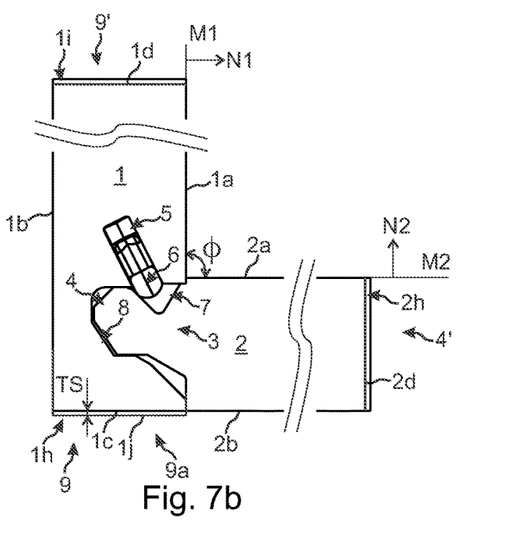

In some embodiments, an edge strip 1h is provided on, such as bonded to, the side edge surface 1c, see FIGS. 7a-7b. In a first example, as shown in FIG. 7a, the outer face 2b of the second panel and the, preferably outer surface 1j of, the edge strip 1h may be essentially flush with each other in the locked state. In a second example, as shown in FIG. 7b, the outer face 2b and the side edge surface 1c may be essentially flush with each other in the locked state and/or the, preferably outer surface 1j of, the edge strip 1h may extend outward of the side edge surface 1c along the second direction Y. Optionally, the side edge surfaces 1d and/or 2d may also be provided with an edge strip ii, 2h, even though these may be left out.

The edge strip 1h, ii, 2h may be an edge banding. For example, the edge strip 1h, ii, 2h may comprise a paper, a veneer, or a thermoplastic strip, such as polypropylene, PP, or acrylonitrile butadiene styrene, ABS. The paper may comprise, such as being impregnated with, a resin, such as a melamine-formaldehyde resin. A, preferably maximal, thickness TS of the edge strip 1h, ii, 2h may be less than 2.0 mm, preferably 0.4-1.5 mm, more preferably 0.5-1.0 mm. The edge strip may be bonded to the side edge surface 1c, 1d, 2d by means of an adhesive. For example, a hot-melt adhesive may be used, or the edge strip may comprise a layer of adhesive configured to melt from an activation by hot air or laser. Any of the embodiments disclosed herein, such as in any of FIGS. 1a-1c, 2a-2g, 3a-3f, 4a-4d, 5a-5e, 6a-6b and 7c-7e, may comprise one or several edge strips 1h, ii, 2h.

In any of the embodiments herein, such as in any of FIGS. 1a-1c, 2a-2g, 3a-3f, 4a-4d, 5a-5e, 6a-6b and 7a-7e, the insertion groove 5 may extend along at least 50% of a length L1 of the first panel along the third direction Z, such as along its entire length L1. Alternatively, or preferably additionally, the edge section 4, preferably including the tongue groove 7, may have an essentially constant cross-section along at least 50% of a length L2 of the second panel along the third direction Z, such as along its entire length L2.

In any of the embodiments herein, such as in any of FIGS. 1a-1c, 2a-2g, 3a-3f, 4a-4d, 5a-5e, 6a-6b and 7a-7e, the elevated portion 8 may extend along a length L0 of at least 5%, preferably at least 50%, or sometimes an entirety, of a longitudinal length LG of the groove 3 along the third direction Z. A remaining portion of the longitudinal length LG without the elevated portion 8 may comprise a raised section 8' having an area A' that is smaller than 3% of the area B, such as being absent, cf. FIGS. 2c, 2f and 5d, where i.a. a groove 3 without the elevated portion 8 is shown in the outer section 12 by the broken line 3'. For example, the groove 3 may have a substantially full depth. Other features of the raised section 8' may be the same as for the elevated portion 8. For example, the area A' may be defined by the planes P1, P2 and/or P3, P4, cf. FIG. 5d, and, furthermore, the raised section 8' may comprise a concave segment.

Figure 2E:
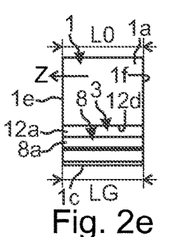
FIGS. 2e-2g illustrate in front views embodiments of an inner face of a first panel of a set of panels.
Figure 2F:
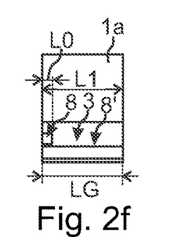
Figure 2G:
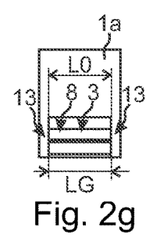

In a first example, the groove 3 extends along the entire length L1 of the first panel and the elevated portion 8 extends along substantially the entire groove 3, see FIG. 2e. In a second example, the groove 3 extends along the entire length L1 of the first panel and the elevated portion 8 extends along less than 20% of the length L1, e.g., at a region along a side edge surface 1c, 1d, such as in proximity to one or both side end surfaces 1e, 1f, see FIG. 2f. Thereby, it may provide a local reinforcement. In a third example, the groove 3 extends along a portion of the length L1, thereby preferably being defined by one or two side walls 13, and the elevated portion 8 preferably extends along the entire length LG, see FIG. 2g. By means of the side wall(s) 13 the groove 3 may be concealed in the side end surfaces 1e and/or 1f. The edge section 4 may comprise a cavity 16 or two cavities for accommodating the respective side wall(s) 13, cf. FIG. 7e.

It is emphasized that the embodiments shown in FIGS. 6a-6b are exemplary and that any of the other elements 3, 4, 5, 6, 7, 8, 9, 10, 11, 12, 13, 14, 15, 16, 17, etc., described herein may be utilized therein. For example, the embodiments in the zoomed-in region shown in any of FIG. 2d, 3d-3f, 4d or 5d-5e are equally conceivable for the panels 1, 2 in FIG. 6a or 6b. In addition, the panels 1, 2 in FIGS. 6a-6b are suitable to be adapted to be assembled to an assembled article 20, such as a box or a furniture assembly, in analogy with the embodiments shown in, e.g., FIGS. 7c-7d. Optionally, the article 20 may comprise a backside member 17, e.g., provided in backside grooves of the panels and/or being nailed thereto.

Aspects of the disclosure has mainly been described above with reference to a few embodiments. However, as is readily appreciated by a person skilled in the art, other embodiments than the ones disclosed above are equally possible within the scope of the disclosure, as defined by the appended patent claims. For example, the set of panels may comprise a plurality of panels similar to the first 1 and second 2 panels, which may be assembled and locked to each other in a similar manner as the first and second panels.

Figure 7C:
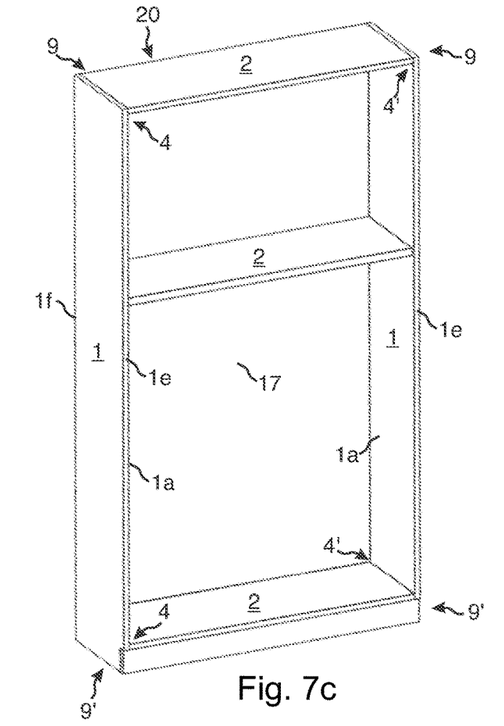
FIGS. 7c-7d illustrate in a perspective view (FIG. 7c) and a side view (FIG. 7d) embodiments of an assembled article, such as a furniture assembly.
Figure 7D:
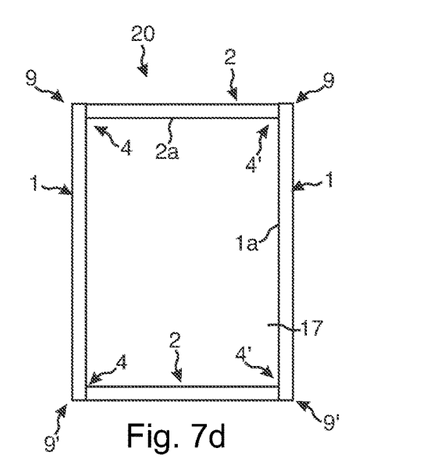
Figure 7E:
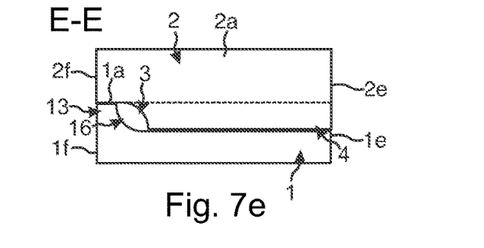
FIG. 7e illustrate an embodiment, e.g., of the set of panels in FIG. 1a along the lines E-E in a front view.

Moreover, it is understood that the first and/or the second panel(s) disclosed herein may be further provided with a mechanical locking device at the opposing edge section(s) 9' and/or 4' that are/is similar to the mechanical locking device provided at the edge section(s) 4 and/or 9 (or 9 and/or 4) described herein, cf. FIGS. 7c-7d.

EXAMPLES

A strength of a shelf support of samples of pairs of panels 1, 2 in the form of foliated particle boards provided in an assembled piece of furniture in the form of a box was tested in accordance with SS-EN 14749:2016. The piece of furniture comprised two sets of samples of panels 1, 2 as well as a 3 mm sample backside member 17 of foliated HDF, see FIG. 7d. Sample pairs R1, R2, R3, R4 and Q1, Q2, Q3, Q4 having a density of 659-690 kg/m$^3$ and an internal bond of 0.40-0.58 and sample pairs R1', R2', R3' and Q1', Q2', Q3' having a density of 672-688 kg/m$^3$ and an internal bond of 0.64 were tested. The internal bond was tested using EN 319. The samples of the panels 1 and 2 had face dimensions 720×350 mm and 384.6×350 mm, respectively, and all samples had a thickness T1, T2 of 16 mm. The samples of the panels 1 comprised a groove 3 at their respective edge sections 9, 9' and the samples of the panels 2 comprised a pair of oppositely arranged edge sections 4, 4', each extending 8.3 mm from a main part thereof. Moreover, the groove was characterized by WB=6.15 mm, D=8.5 mm and U1=9.0 mm. Each groove was delimited by a side wall 13, whereby the full depth D of the groove started 50 mm from one side end surface 1f, and was sidewardly open at the other side end surface 1e, see FIG. 7e. The cross-section of the groove was constant along the entire longitudinal length LG. A cross-section of the edge section 4, 4' of the samples of the second panels 2 was constant along the entire length L2, except at the location of a cavity 16 extending 50 mm from one side end surface 2f.

The samples of the first panels 1 in Q1-Q4 and Q1'-Q3' included a substantially triangularly shaped elevated portion with W=3 mm and H=2 mm, thereby having an area A of about 3 mm$^2$, and an area B of the bottom portion was about 12.3 mm$^2$, implying that A/B was about 0.24, corresponding to 24%. The samples of the panels 1 in R1-R4 and R1'-R3' comprised a groove of a standard type as that indicated by the broken line 3' in FIG. 2c, viz. without an elevated portion. Nevertheless, this groove included a raised section 8' in the form of a concave segment having an outer radius of about 1.2 mm, thereby having an area A' of about 0.31 mm$^2$. Hence, comparing to the area B of the bottom portion, which was the same as above, a corresponding value of A'/B of these reference samples was about 0.01, corresponding to 1%.

The samples of the panels 1, 2 in R2, R3, R4, Q2, Q3, Q4, R1', R2', R3', Q1', Q2' and Q3' were provided with edge bandings on their side edge surfaces. The outer surface 1j of the edge strip 1h extended outward of the side edge surface 1c as illustrated in FIG. 7b. Their thicknesses TS are summarized in Table 1. R1 and Q1 were not provided with any edge bandings. Table 1 also indicates the test results of each sample pair performed in accordance with SS-EN 14749:2016. A typical crack CR of the reference sample of the first panel 1 is schematically illustrated in FIG. 2c. It may be seen that, as compared to the reference sample R1-R4, a failure rate of the respective sample Q1-Q4 decreased significantly. Moreover, the sample Q3' passed the test, while the reference sample R3' did not. Hence, by having the elevated portion, the resistance against dynamical loads increased considerably. Additionally, a thinner edge banding could be used while providing said resistance.

TABLE 1

Sample properties and test results

| Sample | TS | Test result | Sample | TS | Test result |
|---|---|---|---|---|---|
| R1 | — | Fail | Q1 | — | Fail |
| R2 | 0.5 | Fail | Q2 | 0.5 | Pass |
| R3 | 0.8 | Fail | Q3 | 0.8 | Pass |
| R4 | 1.0 | Pass | Q4 | 1.0 | Pass |
| R1' | 0.5 | Fail | Q1' | 0.5 | Fail |
| R2' | 0.8 | Fail | Q2' | 0.8 | Fail |
| R3' | 1.0 | Fail | Q3' | 1.0 | Pass |

Embodiments

Item 1. A set of panels comprising a first panel (1) and a second panel (2) configured to assume a locked state in which a first main plane (M1) of the first panel is arranged at an angle (ϕ) of between 30° and 150°, such as between 45° and 135°, relative to a second main plane (M2) of the second panel, the set comprising:

a groove (3) provided in the first panel, an edge section (4) of the second panel,
an insertion groove (5) provided in the groove (3) of the first panel, a separate tongue (6) being arranged in the insertion groove, and
a tongue groove (7) provided in the edge section (4) of the second panel,
wherein the separate tongue (6) is configured to cooperate with the tongue groove (7) for locking the first (1) and second (2) panels to each other in a first direction (X) perpendicular to the first main plane (M1),
wherein the edge section (4) of the second panel is configured to cooperate with the groove (3) of the first panel for locking the first (1) and second (2) panels to each other in a second direction (Y) parallel to the first main plane (M1) and extending towards a side edge surface (1c) of the first panel, and
wherein a bottom portion (3a) of the groove (3) comprises an elevated portion (8) arranged at least in an outer section (12) of the groove (3) along the second direction (Y), an area (A) of the elevated portion (8) being at least 3% of an area (B) of a rectangular bounded region (R) extending along boundaries of the bottom portion (3a).

Item 2. The set according to item 1, wherein the area (A) of the elevated portion (8) and the area (B) of the bounded region (R) are defined in a cross-sectional side view of the first panel (1).

Item 3. The set according to item 1 or 2, wherein the bounded region (R) is defined by
a first (P1) and a second (P2) plane being parallel to the first main plane (M1), the first plane (P1) extending along an innermost portion (12a) of the groove (3) and the second plane (P2) extending along a highest portion (8b) of the elevated portion (8) along the first direction (X), and/or
a third (P3) and a fourth (P4) plane extending along the first direction (X) and along a third direction (Z) being perpendicular to the first (X) and the second (Y) directions, the third (P3) and the fourth (P4) planes extending along a respective outermost wall portion (12b; 12c) of the bottom portion (3a) along the second direction (Y).

Item 4. The set according to any of the preceding items, wherein the groove (3) is provided in an edge section (9) of the first panel (1).

Item 5. The set according to any of the preceding items, wherein a width (W) of the elevated portion (8) along the second direction (Y) is at least 20%, preferably at least 30%, of a width (WB) of the bottom portion (3a) along the second direction (Y).

Item 6. The set according to any of the preceding items, wherein a height (H) of the elevated portion (8) along the first direction (X) is 5-60%, preferably 12-50%, of a depth (D) of the groove (3).

Item 7. The set according to any of the preceding items, wherein the groove (3) further comprises a main groove portion (3b) provided outside of the bottom portion (3a) along the first direction (X) and wherein the edge section (4) comprises a first (4a) and a second (4b) edge portion, said second edge portion (4b) being configured to cooperate with the main groove portion (3b) in said locked state.

Item 8. The set according to any of the preceding items, wherein a first edge portion (4a) of the edge section (4) tapers moving outwardly along the first direction (X).

Item 9. The set according to any of the preceding items, wherein an external wall (8a) of the elevated portion (8) extends between an innermost portion (12a) of the groove (3) and a main groove portion (3b) provided outside of the bottom portion (3a) along the first direction (X).

Item 10. The set according to any of the preceding items, wherein an external wall (8a) of the elevated portion (8) comprises at least one planar segment.

Item 11. The set according to any of the preceding items, wherein an external wall (8a) of the elevated portion (8) comprises a convex segment and/or a concave segment.

Item 12. The set according to any of the preceding items, wherein a shape of an external wall (8a) of the elevated portion (8) substantially corresponds to a shape of a tapering segment (4c) of the first edge portion (4a) configured to face the external wall in the locked state.

Item 13. The set according to any of the preceding items, wherein at least an inner section (10a) of a main groove portion (3b) of the groove (3) has an essentially constant width (WG) and/or wherein at least a section (10b) of a second edge portion (4b) of the edge section (4) has an essentially constant width (WE).

Item 14. The set according to any of the preceding items, wherein the bottom portion (3a) is asymmetric along a centre line (CX) extending along the first direction (X).

Item 15. The set according to any of the preceding items, wherein the bottom portion (3a) and/or the first edge portion (4a) are/is disposed inwardly of an opening (5a) of the insertion groove (5) along the first direction (X) in the locked state.

Item 16. The set according to any of the preceding items, wherein the elevated portion (8), preferably the entire bottom portion (3a), is spaced from the edge section (4) of the second panel in the locked state by at least one space (S1; S2; S3).

Item 17. The set according to any of the preceding items, wherein a thickness (U1) along the second direction (Y) between the groove (3) and a side edge surface (1c) of the first panel is greater than a minimal thickness (U2) of the edge section (4) of the second panel.

Item 18. The set according to any of the preceding items, wherein a ratio (W/D) between a width (W) of the elevated portion (8) along the second direction (Y) and a depth (D) of the groove (3) exceeds 0.20.

Item 19. The set according to any of the preceding items, wherein the first main plane (M1) is arranged essentially perpendicularly to the second main plane (M2).

Item 20. The set according to any of the preceding items, wherein an edge strip (1h) is provided on the side edge surface (1c).

Item 21. An assembled article (20) comprising the set of panels according to any of the preceding items 1-20.

The invention claimed is:

1. A set of panels comprising a first panel and a second panel configured to assume a locked state in which a first main plane of the first panel is arranged at an angle of between 30° and 150°, relative to a second main plane of the second panel, wherein the set comprises:
a groove provided in the first panel,
an edge section of the second panel,
an insertion groove provided in the groove of the first panel, a separate tongue being arranged in the insertion groove, and
a tongue groove provided in the edge section of the second panel,
wherein the separate tongue is configured to cooperate with the tongue groove for locking the first and second panels to each other in a first direction perpendicular to the first main plane, wherein the edge section of the second panel is configured to cooperate with the groove of the first panel for locking the first and second panels to each other in a second direction parallel to the first main plane and extending towards a side edge surface of the first panel, and wherein a bottom portion of the groove comprises an elevated portion arranged at least in an outer section of the groove along the second direction, an area of the elevated portion being at least 10% of an area of a rectangular bounded region extending along boundaries of the bottom portion, wherein the area of the elevated portion and the area of the bounded region are defined in a cross-sectional side view of the first panel, wherein the bounded region is defined by
- a first and a second plane being parallel to the first main plane, the first plane extending along an innermost portion of the groove and the second plane extending along a highest portion of the elevated portion along the first direction, and/or
- a third and a fourth plane extending along the first direction and along a third direction being perpendicular to the first and the second directions, the third and the fourth planes extending along a respective outermost wall portion of the bottom portion along the second direction.

2. The set according to claim 1, wherein a width of the elevated portion along the second direction is at least 20% of a width of the bottom portion along the second direction.

3. The set according to claim 1, wherein a height of the elevated portion along the first direction is 5-60% of a depth of the groove.

4. The set according to claim 1, wherein the groove further comprises a main groove portion provided outside of the bottom portion along the first direction and wherein the edge section comprises a first and a second edge portion, said second edge portion being configured to cooperate with the main groove portion in said locked state.

5. The set according to claim 4, wherein the second edge portion and the main groove portion are configured to cooperate for locking in the second direction.

6. The set according to claim 1, wherein a first edge portion of the edge section tapers moving outwardly along the first direction.

7. The set according to claim 1, wherein an external wall of the elevated portion extends between an innermost portion of the groove and a main groove portion provided outside of the bottom portion along the first direction.

8. The set according to claim 1, wherein an external wall of the elevated portion comprises at least one planar segment.

9. The set according to claim 1, wherein an external wall of the elevated portion comprises a convex segment and/or a concave segment.

10. The set according to claim 1, wherein a shape of an external wall of the elevated portion substantially corresponds to a shape of a tapering segment of the first edge portion configured to face the external wall in the locked state.

11. The set according to claim 1, wherein at least an inner section of a main groove portion of the groove has an essentially constant width and/or wherein at least a section of a second edge portion of the edge section has an essentially constant width.

12. The set according to claim 1, wherein the bottom portion is asymmetric along a centre line extending along the first direction.

13. The set according to claim 1, wherein the bottom portion and/or the first edge portion are/is disposed inwardly of an opening of the insertion groove along the first direction in the locked state.

14. The set according to claim 1, wherein the elevated portion is spaced from the edge section of the second panel in the locked state by at least one space.

15. The set according to claim 1, wherein a thickness along the second direction between the groove and the side edge surface of the first panel is greater than a minimal thickness of the edge section of the second panel.

16. The set according to claim 1, wherein a ratio between a width of the elevated portion along the second direction and a depth of the groove exceeds 0.20.

17. The set according to claim 1, wherein the first main plane is arranged essentially perpendicularly to the second main plane.

18. The set according to claim 1, wherein an edge strip is provided on the side edge surface.

19. An assembled article comprising the set of panels according to claim 1.

20. The set according to claim 1, wherein the area of the elevated portion is in the range of 10-70% of the area of a rectangular bounded region extending along boundaries of the bottom portion.

21. The set according to claim 2, wherein the width of the elevated portion along the second direction is in the range of 20-80% of the width of the bottom portion along the second direction.

22. The set according to claim 16, wherein the ratio between the width of the elevated portion along the second direction and a depth of the groove is in the range of 0.20-0.60.

* * * * *